United States Patent [19]

Freeman et al.

[11] Patent Number: 5,027,537
[45] Date of Patent: Jul. 2, 1991

[54] VEHICLE EMBLEM AND LICENSE PLATE HOLDER

[75] Inventors: Thomas R. Freeman, North Oaks; Jill L. Kemna, Bloomington, both of Minn.

[73] Assignee: Paragon Classics, Inc., Roseville, Minn.

[21] Appl. No.: 410,461

[22] Filed: Sep. 21, 1989

Related U.S. Application Data

[63] Continuation-in-part of Ser. No. 329,114, Mar. 27, 1989, and a continuation-in-part of Ser. No. 285,955, Dec. 19, 1988, Pat. No. Des. 314,930.

[51] Int. Cl.⁵ .............................................. G09F 7/00
[52] U.S. Cl. ........................................ 40/210; 40/209
[58] Field of Search .......................... 40/210, 209, 591

[56] References Cited

U.S. PATENT DOCUMENTS

| D. 51,126 | 8/1917 | Thomas | D11/99 |
|---|---|---|---|
| D. 95,381 | 4/1935 | Schlesinger | D11/112 |
| D. 173,634 | 12/1954 | Allen | D11/95 |
| 382,367 | 5/1888 | Lee | 40/1.5 |
| 1,492,285 | 4/1924 | Christopher | 40/911 |
| 1,621,582 | 3/1927 | Collamore | 40/209 |
| 1,879,906 | 9/1932 | Linstrom | 40/209 |
| 1,910,211 | 5/1933 | Zaiger et al. | 40/210 |
| 2,636,299 | 4/1953 | McDermott | 40/210 |
| 2,739,400 | 3/1956 | Hieger | D11/95 |
| 2,880,535 | 4/1959 | Bryant | 40/210 |
| 3,200,524 | 8/1965 | Hendrickson | 40/591 |
| 3,408,760 | 11/1968 | Barr | 40/210 |
| 3,908,296 | 9/1975 | Harrison | 40/210 |
| 4,445,291 | 5/1984 | Easley | 40/210 |
| 4,691,457 | 9/1987 | Peroni | 40/1.5 |
| 4,767,647 | 8/1988 | Bree | 40/1.5 |

OTHER PUBLICATIONS

Comet Products publication.

Primary Examiner—Laurie K. Cranmer
Assistant Examiner—J. Bonifanti
Attorney, Agent, or Firm—Burd, Bartz & Gutenkauf

[57] ABSTRACT

A personalized vehicle emblem secured to a vehicle license plate holding structure with mounting hardware. The emblem has a generally circular shield that has inscribed personalized information. A circular body located in a central recess of the shield carries various symbols. The plate holding structure has a rectangular frame having inwardly directed ears. The ears accommodate fasteners for attaching a license plate to the frame. Flat walls of the frame hold the license plate in a recessed location. The mounting hardware has one or more brackets secured to the plate holding structure. The brackets are adapted to support the emblems.

21 Claims, 14 Drawing Sheets

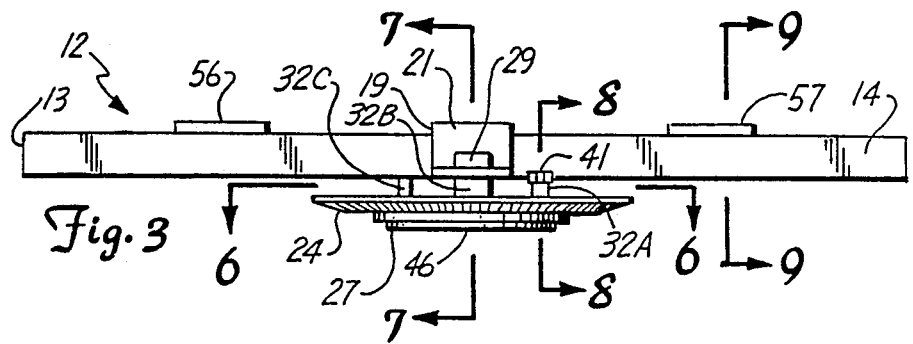
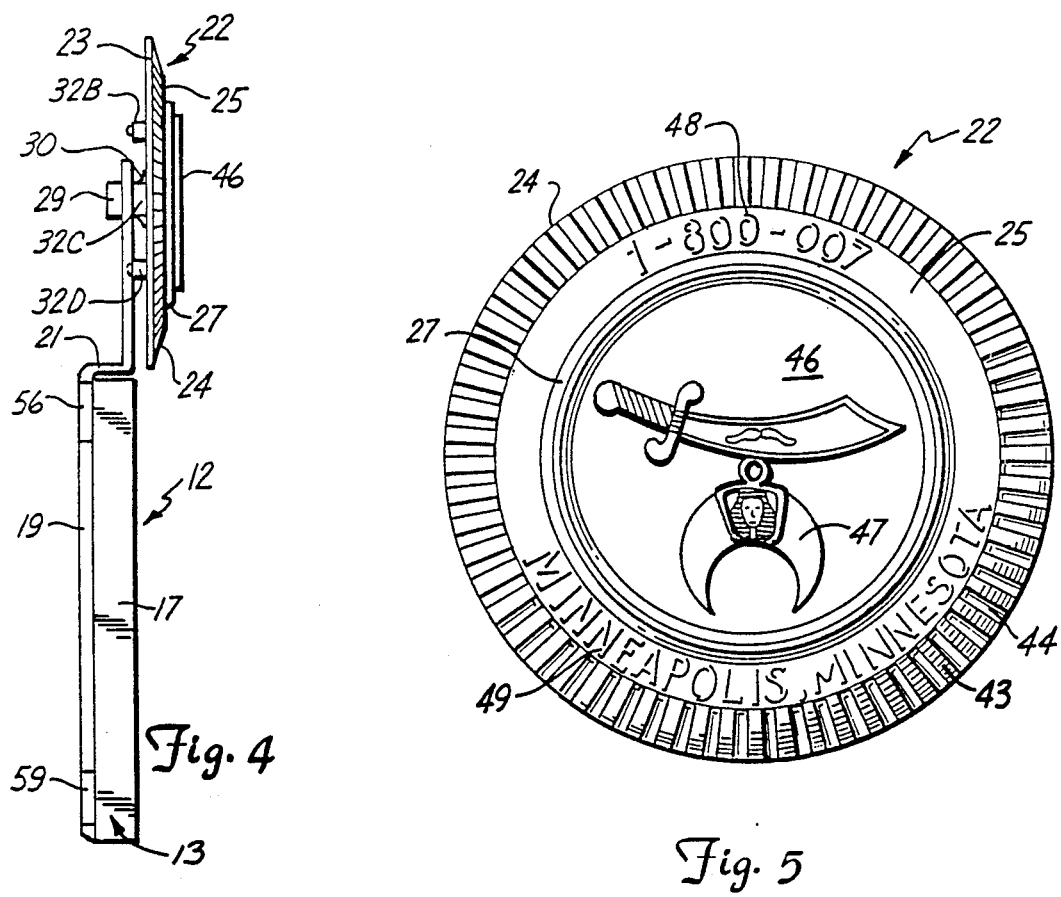

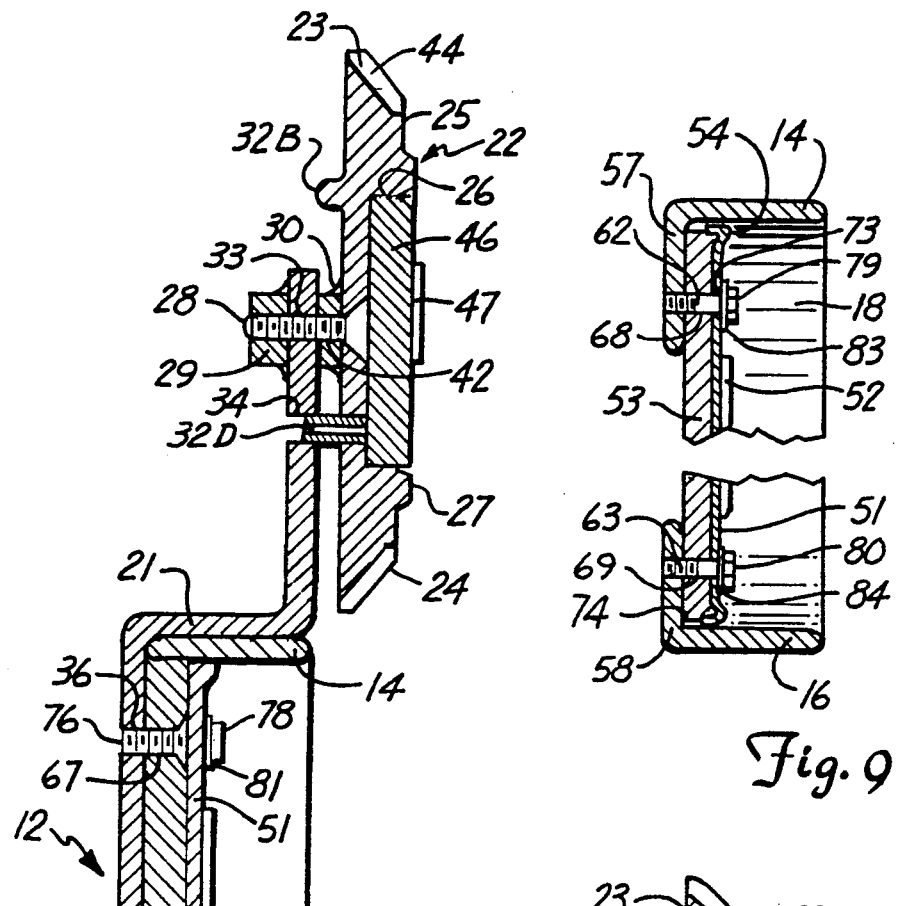
Fig. 9
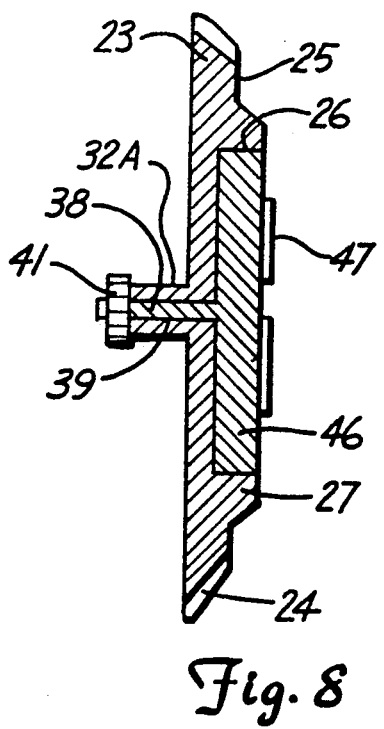
Fig. 7
Fig. 8

VEHICLE EMBLEM AND LICENSE PLATE HOLDER

CROSS REFERENCE TO RELATED PATENT APPLICATIONS

This application is a continuation-in-part of U.S. patent application Ser. No. 329,114 filed Mar. 27, 1989, pending and U.S. patent application Ser. No. 285,955 filed Dec. 19, 1988, now U.S. Pat. No. 0,314,930.

FIELD OF INVENTION

The invention relates to car emblems and assemblies for mounting emblems and license plates on a vehicle.

BACKGROUND OF INVENTION

Many motor vehicle drivers and owners develop strong attachments to their vehicles. Styling, design, operation and care of the vehicles is a major preoccupation of these persons. A person's identity is often directly connected to his or her vehicle. The vehicle becomes the personification of the person's personality. This extension of one's self is further embraced with identification objects, such as emblems, badges, and medallions. The objects have identification designs and trademarks that are prominently displayed on the vehicles.

Various structures have been used to mount vehicle emblems or badges and license plates on the body of a vehicle. For example, in Peroni, U.S. Pat. No. 4,691,457, a car emblem attached to a circular hub is disclosed. The hub has a central opening for accommodating a bolt to secure the assembly to an automobile. This structure requires that the car badge be mounted on the grill of the vehicle. In the event that the bolt comes loose, the car badge will rattle, thereby making noise and damaging the grill.

SUMMARY OF THE INVENTION

The invention relates to personalized vehicle identification structures, known as vehicle badges or emblems, and holders for conventional vehicle license plates. Mounting hardware is provided to secure the emblems to the license plate holders. The emblems have shields with circumferencial design surfaces for accommodating personalized engraving, such as the vehicle's year, model, and number, and the driver's or owner's name and organization affiliation. The holders for the license plates have generally rectangular frames provided with ears adapted to accommodate fasteners used to attach the license plates to the frames. The frames have generally flat, elongated strip walls projected in lateral outward directions, so as to retain the license plates in recess protected locations. The mounting hardware comprise brackets secured to the license plate holders to support one or more emblems. Locating and holding structures fix the emblems to the brackets so that they are difficult to remove and are relatively theft-resistant.

A preferred embodiment of the emblem has a generally circular shield or base having a circular sunburst ribbed outer peripheral edge surrounding a generally smooth circular ring. Identification indicia comprising personalized information is inscribed on the ring according to the desires of the vehicle owner or driver. The central portion of the shield has a circular recess that accommodates a circular body carrying a symbol, trademark, artwork, such as vehicle trademarks and fraternal organization symbols. The body is secured to the base.

The license plate holder comprises a generally rectangular frame having top and bottom members joined to side members to form a rectangular structure having a recess of the approximate size of a conventional license plate. A plurality of ear means are joined to the top and bottom members for accommodating fasteners for connecting the vehicle license plate to the frame. The top and bottom and side members are a generally flat strap that projects outwardly in a normal horizontal direction to provide a recessed frame-like structure for the license plate. The ears means comprise pairs of ears joined to the top and bottom members to accommodate fasteners, such as screws that project through the conventional holes in the top and bottom portions of a license plate. The fasteners or additional fasteners are used to secure the holder to the vehicle bumper or other vehicle structure. The holder includes a mounting plate that is located between the ears and the license plate to provide a backing and support for the license plate. The mounting plate is also adapted to accommodate one or more emblems when a license plate is not attached to the frame.

Brackets are used to secure the emblems to the license plate holders. Fasteners connect the brackets to either the ears or the mounting plate. The brackets can contain a forwardly directed step that locates the emblem in a vertical plane adjacent the front of the frame. The brackets can also include horizontal adjustable structures to accommodate different vehicle structures.

DESCRIPTION OF DRAWING

FIG. 3 is an enlarged top view of the emblem and holder of FIG. 2;

FIG. 4 is an enlarged side view of the emblem and holder of FIG. 2;

FIG. 5 is an enlarged front view of the emblem of FIG. 2;

FIG. 7 is an enlarged sectional view taken along line 7—7 of FIG. 3;

FIG. 8 is an enlarged sectional view taken along line 8—8 of FIG. 3;

FIG. 9 is an enlarged foreshortened sectional view taken along line 9—9 of FIG. 3;

DESCRIPTION OF PREFERRED EMBODIMENTS

Figure 1:
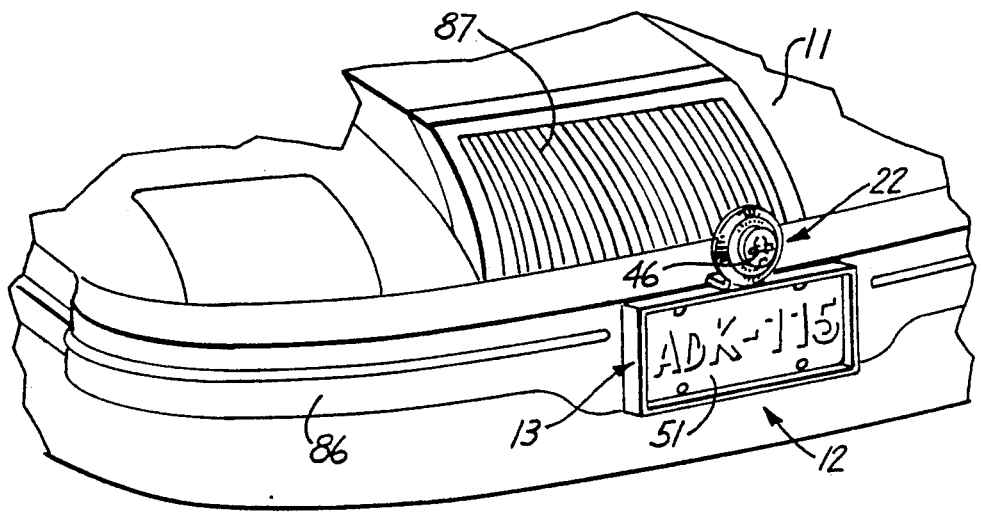
FIG. 1 is a front perspective view of the emblem and license plate holder of the invention mounted on the front of an automobile.
Figure 2:
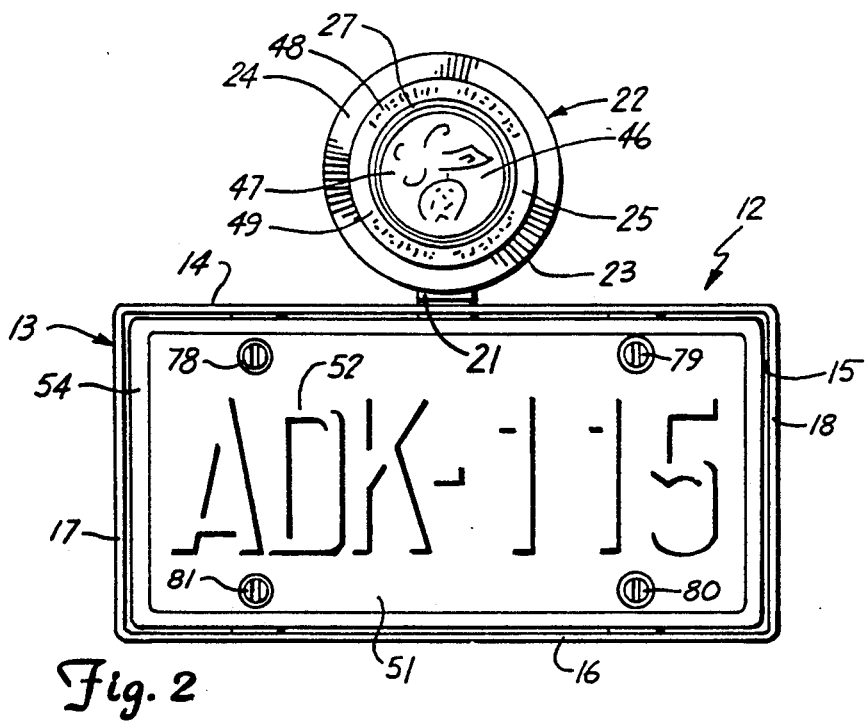
FIG. 2 is an enlarged front elevational view of the emblem and license plate holder of FIG. 1.

Referring to FIGS. 1 and 2, there is shown a vehicle 11 having an emblem or badge and license plate holder of the invention, indicated generally at 12. Vehicle 11 is shown as an automobile. Badge and holder 12 can be used with other vehicles, including but not limited to pick-up trucks, vans, motor homes, trucks and trailers. The emblem and license plate holder 12 provides for safe and secure installation of a personal car badge 22 and a license plate 51 on vehicle 11. Holder 12 is attached to the front end or bumper 86 of vehicle 11 with bracket and supports (not shown) that are part of bumper 86 or the vehicle frame. Holder 12 can also be used on the back end or bumper of vehicle 11. This allows badge 22 to be mounted on vehicle 11 without being attached to grill 87 of vehicle 11.

As shown in FIGS. 2, 3, and 4, holder 12 has a generally rectangular frame 13 having a top wall 14, bottom wall 16 and side walls 17 and 18 joined to opposite ends of top and bottom walls 14 and 16. Walls 14, 16, 17 and 18 are flat metal or plastic strips having uniform widths that extend outwardly from the front end 86 of vehicle 11 to provide an inner framed recess 15 having an area to accommodate a conventional vehicle license plate 51. Walls 14, 16 to 18 surround the outer peripheral edge of license plate 51 to protect plate 51 and provide a visual forwardly projected border around the license plate 51. A generally vertical mounting bracket 19 having an outwardly projected horizontal step 21 is secured to the center portion of holder 12. As shown in FIGS. 3, 4, and 7, step 21 positions the upper section of bracket 19 above the front edge of frame 13. The lower section of bracket 19 is located adjacent the back of frame 13. A personal car emblem or badge, indicated generally at 22, is mounted on the upper section of bracket 19. The step 21 in bracket 19 positions badge 22 adjacent the front edge of top wall 14. This positioning of badge 22 draws attention to the badge.

Figure 6:
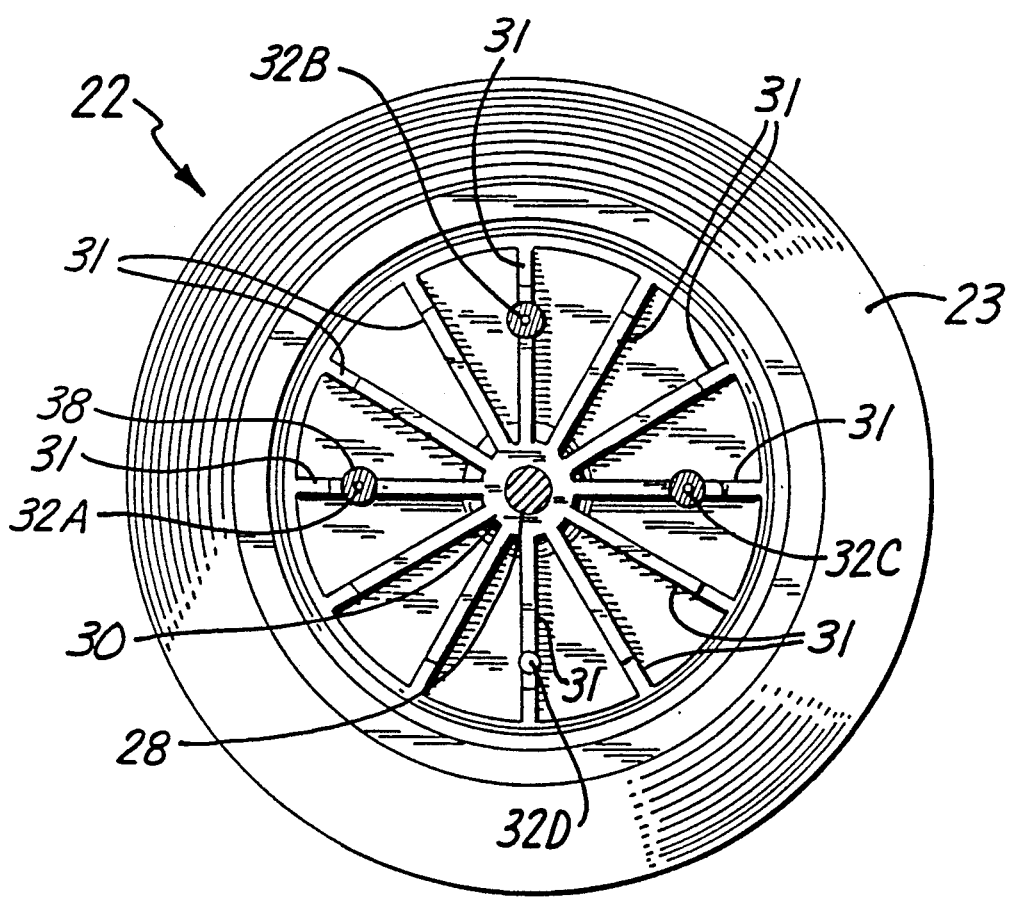
FIG. 6 is an enlarged back view of the emblem of FIG. 2.

Referring to FIGS. 5, 6 and 7, badge 22 has a circular base 23 having an tapered outer rim 24 with a plurality of circumferentially spaced radial ribs 43 separated with radial grooves 44. The center of the front of base 23 has a circular recess 26. An annular lip 27 having facets surrounds the perimeter of the recess 26. The facets are radial ribs extended circumferentially around base 23 to provide a sunburst background. Examples of badge designs are shown and described in co-pending U.S. patent applications Ser. No. 285,955 and Ser. No. 309,065 incorporated herein by reference. Base 23 has a generally flat collar 25 extending between the rim 24 and lip 27. Collar 25 has an annular outer surface accommodating indicia, such as inscribed information, including vehicle year and model number 48 and the place of residence 49 of the vehicle owner. The year date of the vehicle (not shown) can also be included on collar 25. Personalized names and/or artwork can be engraved in the metal of collar 25. The engraved grooves can be filled with enamel to enhance readability. The entire base 23 can be gold or silver plated or coated with non-precious metals or paint.

As shown in FIG. 7, a bolt 28 extends through a hole 42 in base 23 and hole 33 of mounting bracket 19. A nut 29, such as a PEM nut, attaches bolt 28 to bracket 19 to mount badge 22 on holder 12. Nut 29 is fixed to bracket 19 so that it cannot be removed, thereby preventing removal of badge 22 from bracket 19. The back side of badge 22 has a centrally located hub 30. As shown in FIG. 6, a plurality of circumferentially spaced ribs 31 radiate from hub 30. Each rib 31 has an outer edge that is inclined toward the center of base 23. Pegs 32A, 32B, 32C and 32D project from the back side of base 23 adjacent vanes 31 equidistant from hub 30. Peg 32D fits into a hole 34 in mounting bracket 19 to prevent badge 22 from rotating about bolt 28. When car 11 encounters rough terrain, badge 22 does not become misaligned.

As shown in FIGS. 5 and 8, a generally circular body 46 having an outer face carries indicia, such as artwork or symbol 47. For example, indicia 47 may be a fraternal organization, city, state, country, vehicle name or the like. Body 46 fits into recess 26. The outer peripheral edge of body 26 is in contiguous relation with the inside surface of lip 27. A location pin 38 projecting from the back surface of the body 46 extends through a bore 39 in base 23 and peg 32A. As shown in FIG. 8, nut 41 is threaded on the end of pin 38 to secure the body 46 in recess 26 of base 23. Other structures can be used to attach pin 38 to base 23.

Figure 10:
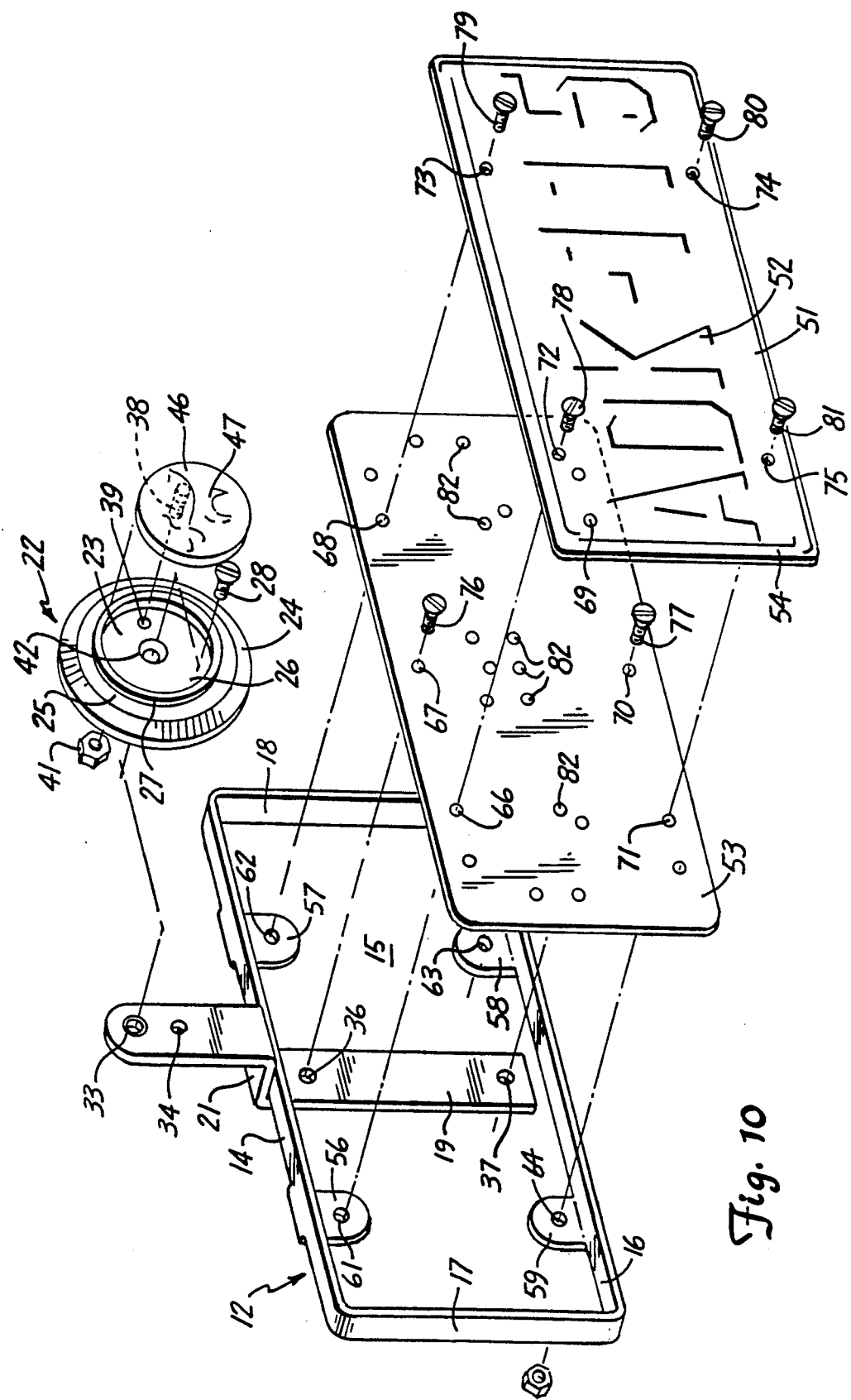
FIG. 10 is an exploded view of the emblem and license plate holder of FIG. 2.
Figure 11:
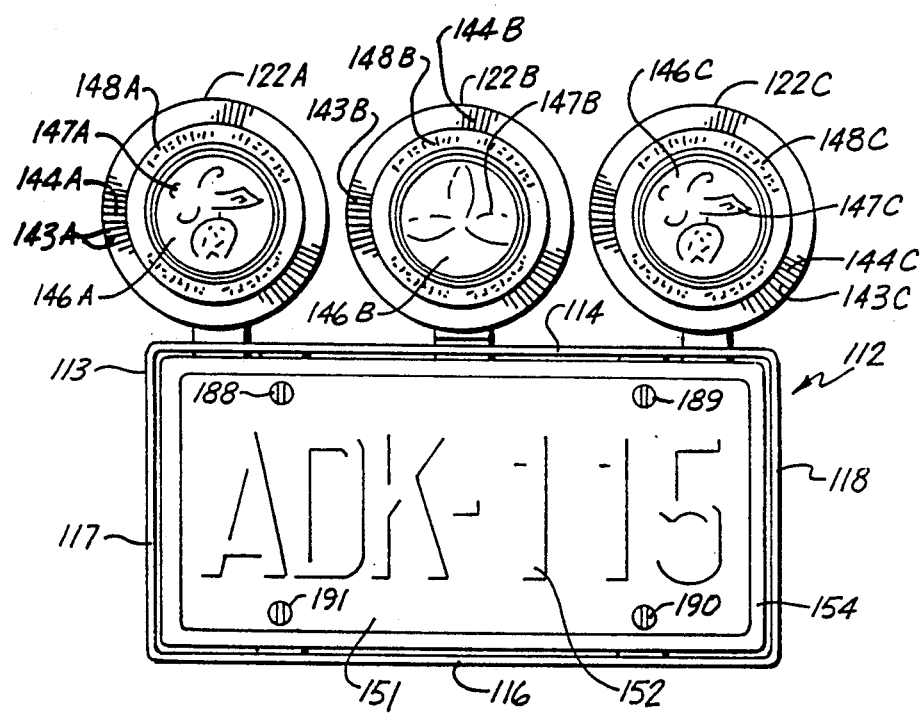
FIG. 11 is a front elevational view of a first modification of the emblem and license plate holder of the invention.

Referring to FIGS. 9 and 10, a plurality of semi-circular tabs or ears 56, 57, 58 and 59 extend inwardly from top wall 14 and bottom wall 16 of holder 12. Ears 56 and 57 are attached to the back edge of top wall 14. Ears 58 and 59 are attached to the back edge of bottom wall 16. As shown in FIG. 10, ear 56 is located in the same vertical plane as ear 59. Ear 57 is located in the same vertical plane as ear 58. Ears 56 to 59 are spaced inwardly at an equal distance from the adjacent corners of frame 13.

A generally rectangular mounting plate 53 having rounded corners is mounted on the lower section of bracket 19 in recess 15. Bolts 76 and 77 extended through holes 67 and 70 in mounting plate 53 are threaded into holes 36 and 37 in bracket 19 to attach plate 53 to holder 12. A conventional vehicle license plate 51 having an outer face with a license number 52 and border 54 is mounted on plate 53. License plate 51 has a rectangular size of 32 by 16 centimeters or 12 by 6 inches. As shown in FIG. 7, holes 67 and 70 are outwardly tapered to counter-sink bolts 76 and 77. The bolts 76, 77 have flat tops so as to not interfere with the mounting of license plate 51 on mounting plate 53. Plate 53 serves as a back support for license plate 51.

Figure 19:
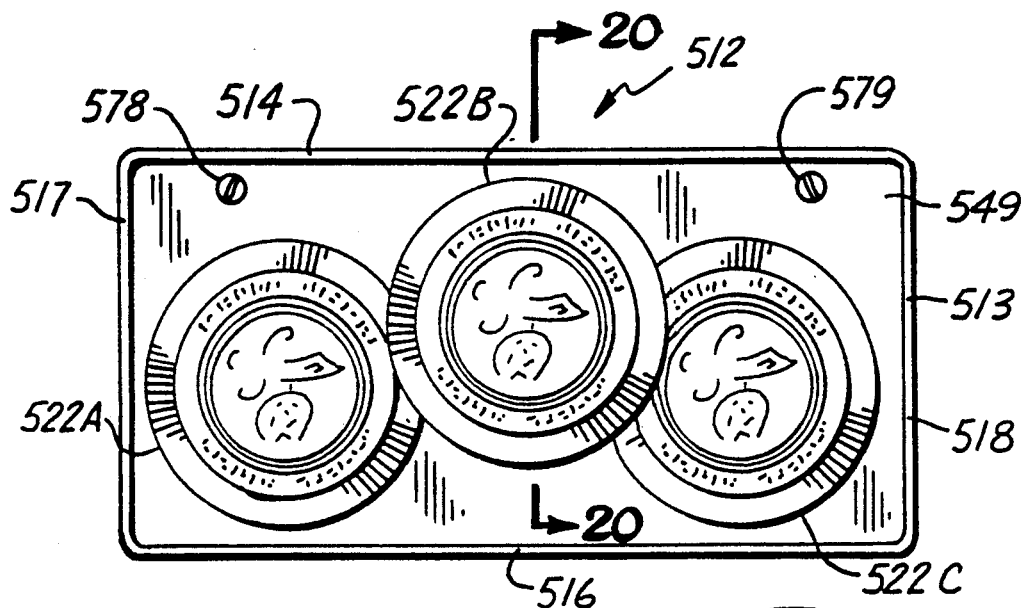
FIG. 19 is a front elevational view of a fifth modification of the emblem and license plate holder of the invention.
Figure 22:
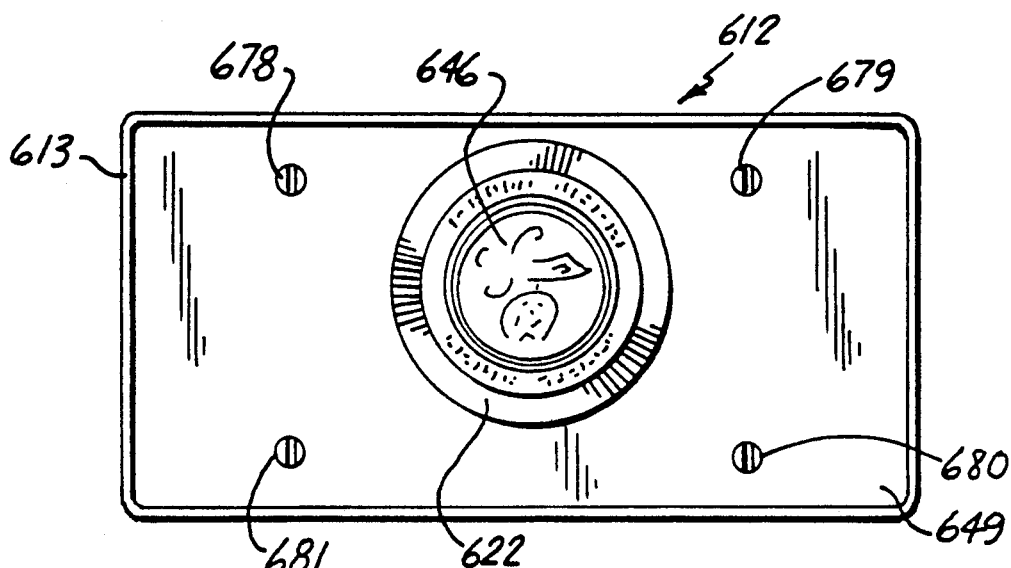
FIG. 22 is a front elevational view of a sixth modification of the emblem and vehicle license plate holder of the invention.
Figure 23:
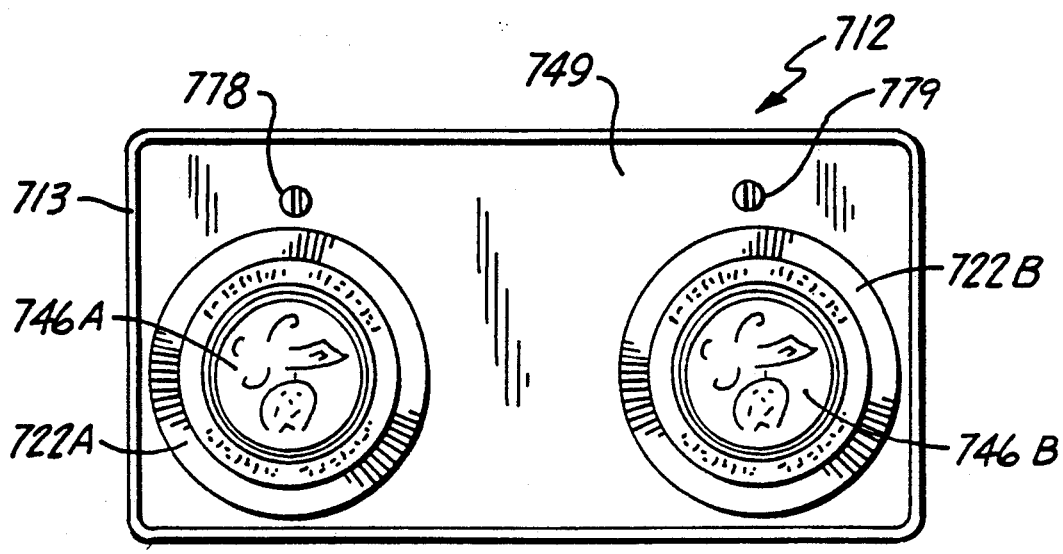
FIG. 23 is a seventh modification of the emblem and vehicle license plate holder of the invention.

In localities where license plate 51 is not required to be attached to the front end 86 of vehicle 11, one or more badges 22 can be mounted on mounting plate 53 as shown in FIGS. 19, 22 and 23. Mounting plate 53 has a plurality of holes 82 to accommodate pegs 32A to 32D of badge 22 for mounting of the badge directly to mounting plate 53.

License plate 51 and mounting plate 53 are substantially the same size and fit into recess 15. Walls 14, 16, 17 and 18 surround the perimeter of license plate 51 and mounting plate 53 and project outwardly from the front face of license plate 51. This enhances the appearance of license plate 51 and draws attention to the license plate and protects the license plate. Bolts 78, 79, 80 and 81 extend through holes 72, 73, 74 and 75 in license plate 51 and holes 66, 68, 69 and 71 in mounting plate 53 and holes 61, 62, 63 and 64 in ears 56 to 59 to mount license plate 51 on holder 12. The outer ends of bolts 78 to 81 are threaded into holes 61-64 to attach holder 12 and license plate 51 on vehicle 11. Nuts (not shown) mounted on ears 56-59 can be used to accommodate bolts 78 to 81.

Referring to FIGS. 11 to 15, there is shown a first modification of the emblem and license plate holder of the invention, indicated generally at 112. Holder 112 enables personal car emblems or badges 122A, 122B and 122C and a license plate 151 to be safely and securely installed on the front end or back end of an automobile (not shown). Badges 122A, 122B and 122C do not have to be mounted on the grill of the vehicle.

Figure 12:
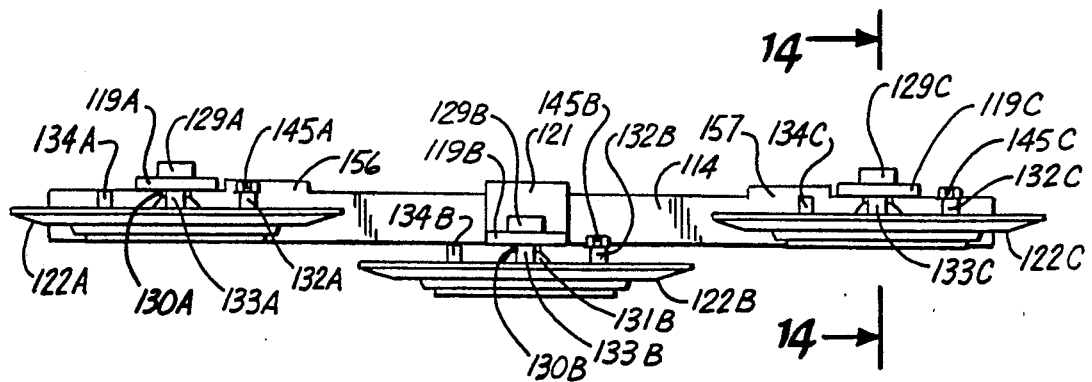
FIG. 12 is a top view of the emblem and holder of FIG. 11.
Figure 13:
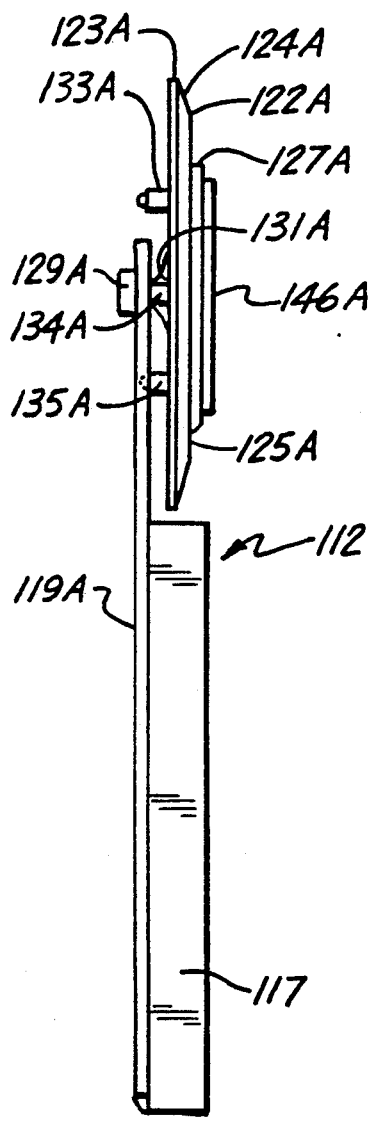
FIG. 13 is a side view of the emblem and holder of FIG. 11.

Holder 112 has a generally rectangular frame 113 having a top wall 114, bottom wall 116 and side walls 117 and 118. Walls 114, 116 to 118 are generally flat strips having a uniform width. Frame 113 has an inner recess 115 defined by walls 114, 116 to 118 to accommodate license plate 151. A plurality of generally vertical mounting brackets 119A, 119B and 119C are attached to top wall 114. Bracket 119B has a horizontal step 121 located over the center of top wall 114. Brackets 119A and 119C are laterally spaced from center bracket 119B on top wall 114. As shown in FIG. 12, step 121 positions the upper section of bracket 119B above the front edge of frame 113. The upper sections of brackets 119A and 119B are positioned above the back edge of frame 113. Personal badges 122A, 122B and 122C are mounted on the upper sections of brackets 119A, 119B and 119C in a staggered relation. Brackets 119A and 119C position badges 122A and 122C adjacent the top surface of wall 114. The step 121 in bracket 119B positions badge 122B adjacent the front edge of top wall 144 forward of badges 122A and 122C. The positioning of badges 122A-122C on holder 112 attracts attention to the badges. The lower sections of bracket 119A to 119C are located adjacent the back of frame 113.

Badges 122A, 122B and 122C have substantially the same structure and are substantially similar to badge 22 shown in FIGS. 5 and 6. Referring to FIGS. 11 to 15, badges 122A-122C each have a circular base 123A-123C having a tapered outer rim 124A-124C with a plurality of circumferentially spaced radial ribs 143A-143C and grooves 144A-144C. The center of the front of base 123A-123C has a circular recess 126A-126C. An annular lip 127A-127C is located around the perimeter of recess 126A-126C. A generally flat collar 125A-125C carrying inscribed data 148A-148C, such as the car model number and the locality of the car owner, extends between rim 124A-124C and lip 127A-127C. Collar 125A-125C can also have the year date of the car and other information.

Each badge 122A to 122C has a generally circular body 146A-146C that fits into recess 126A-126C adjacent lip 127A-127C. Body 146A-146C carries a symbol 147A-147C. A pin 138A-138C projecting from the back of the body 146A-146C extends through a bore 139A-139C in base 123A-123C to maintain the upright orientation of body 146A-146C in recess 126A-126C.

The center of the back side of each badge 122A to 122C has a hub 130A-130C. A plurality of ribs 131A-131C having outer inclined edges radiate from hub 130A-130C. Pegs 132A-132C, 133A-133C, 134A-134C and 135A-135C project from the back side of base 123A-123C. The pegs 132A-132C, 133A-133C, 134A-134C and 135A-135C are located equidistant from hub 130A-130C and are circumferentially spaced on the base 123A-123C. Peg 135A-135C fits into hole 137A-137C in the top section of mounting bracket 119A-119C to prevent the badge 122A-122C from rotating about bolt 128A-128C and becoming misaligned. Pin 138A-138C extends through peg 132A-132C. A fastener, such as nut 145A-145C is threaded on the end of pin 138A-138C to secure body 146A-146C in recess 126A-126C in base 123A-123C.

Figure 15:
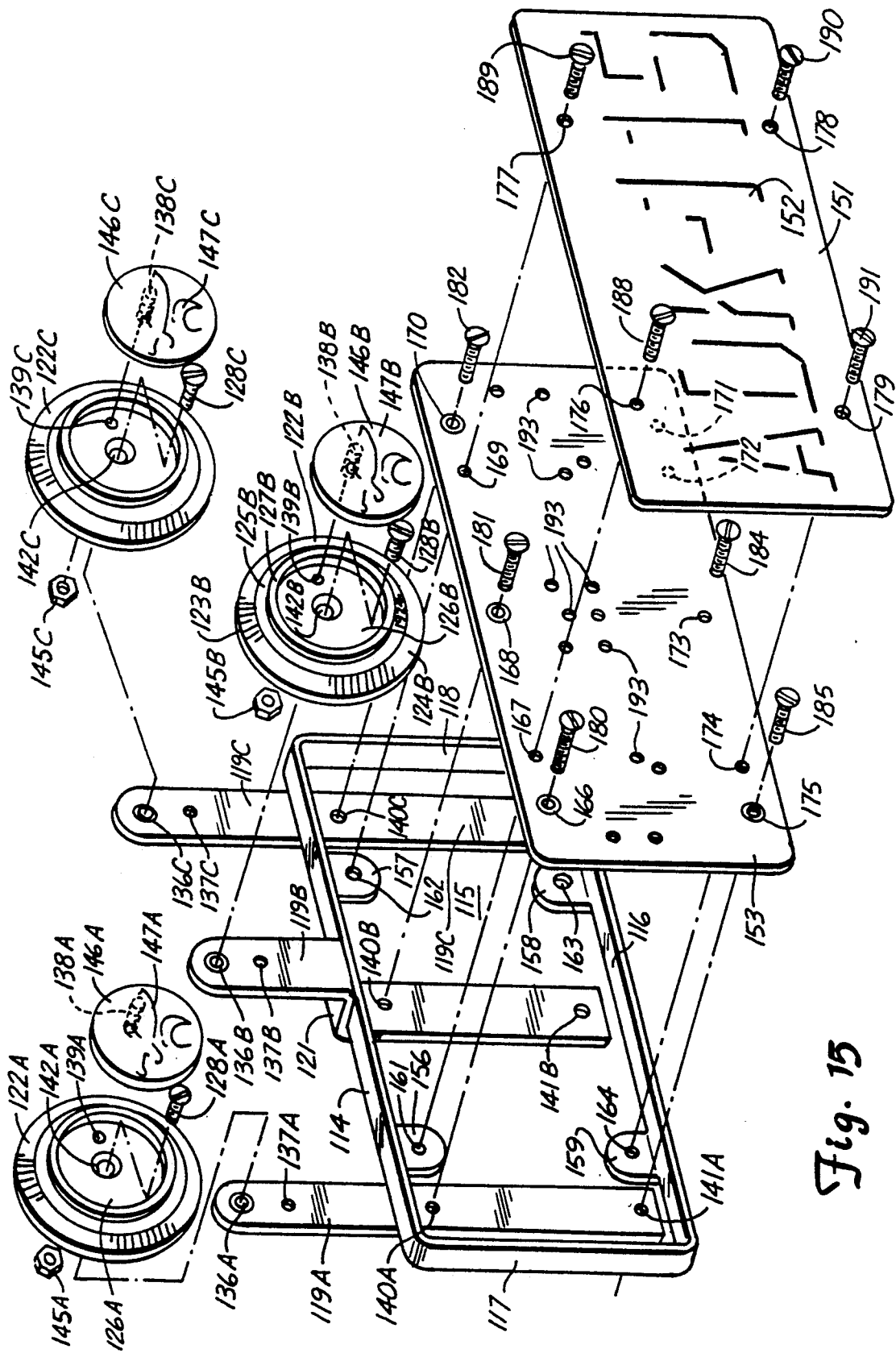
FIG. 15 is an exploded view of the emblem and license plate holder of FIG. 11.

Referring to FIG. 15, a plurality of semi-circular tabs or ears 156, 157, 158 and 159 extend inwardly from top wall 114 and bottom wall 116. Ears 156 and 157 are attached to the back edge of top wall 114. Ears 158 and 159 are attached to the back edge of bottom wall 116. Ear 156 is located in the same vertical plane as ear 159. Ear 157 is located in the same vertical plane as ear 158. Ears 156 to 159 are equally spaced inwardly from the corners of frame 113.

A generally rectangular mounting plate 153 is mounted on the lower sections of brackets 119A-119C in recess 115. Bolts 180 and 185 extend through holes 166 and 175 in mounting plate 153 and are threaded into holes 140A and 141A in bracket 119A. Bolts 181 and 184 extend through holes 168 and 173 in mounting plate 153 and are threaded into holes 140B and 141B in bracket 119B. Bolts 182 and 183 extend through holes 170 and 171 in mounting plate 153 and are threaded into holes 140C and 141C in bracket 119C. This attaches mounting plate 153 to holder 112. Holes 166, 168, 170, 171, 173 and 175 are counter-sunk to position the flat tops of bolts 180 to 185 even with the outer surface of mounting plate 153. This provides a smooth mounting surface for license plate 151.

License plate 151 has an outer face having a license number 152 printed thereon. A border 154 surrounds the outer edge of license plate 151. License plate 151 is mounted on plate 153. One or more badges, as shown in FIG. 19, can also be mounted on mounting plate 151 in localities that do not require that a license plate be located on the front end of the motor vehicle. Mounting plate 153 has a plurality of holes 193 to accommodate the pegs of the badges for mounting the badges directly to mounting plate 153.

License plate 151 and mounting plate 153 are substantially the same size and fit into recess 115. Walls 114, 116, 117 and 118 surround the perimeter of license plate 151 and mounting plate 153 and project outwardly from the outer face of license plate 151 to enhance the appearance of license plate 151 and protect the license plate. Bolts 188, 189, 190 and 191 extend through holes 176, 177, 178 and 179 in license plate 151 and holes 167, 169, 172 and 174 in mounting plate 153 and holes 161, 162, 163 and 164 in ears 156 to 159 to mount license plate 151 on holder 112. The outer ends of bolts 188 to 191 are threaded into the holes 161-164 or nuts secured to ears 156-159 to attach holder 112 and license plate 151 on a vehicle.

Figure 16:
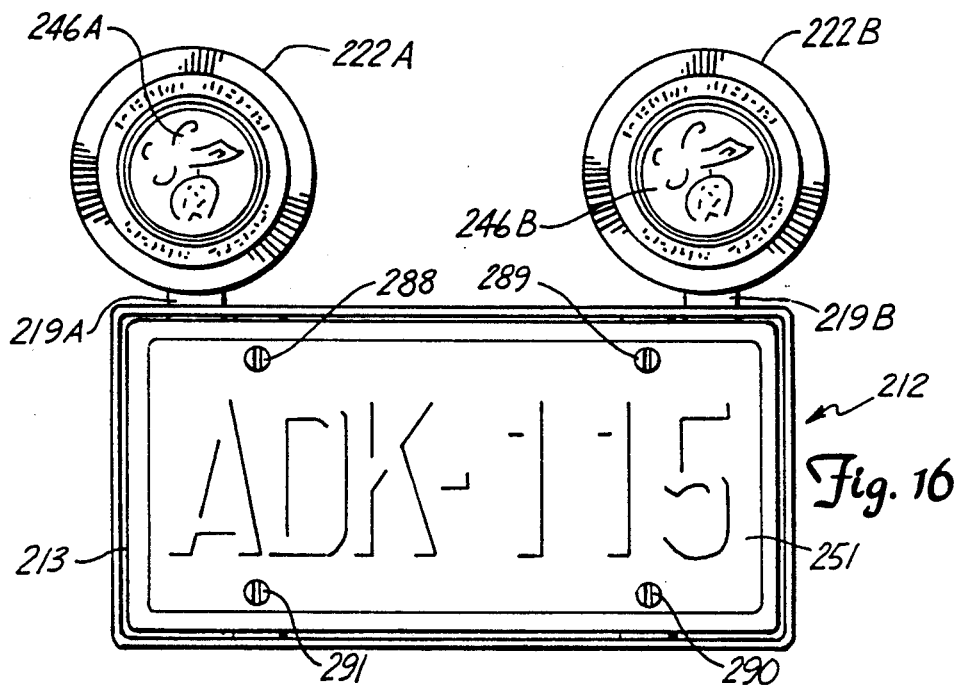
FIG. 16 is a front elevational view of a second modification of the emblem and license plate holder of the invention.
Figure 17:
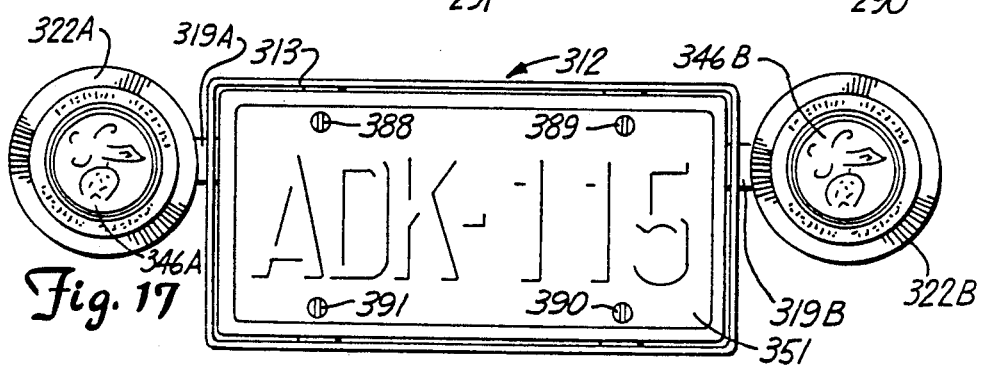
FIG. 17 is a front elevational view of a third modification of the emblem and license plate holder of the invention.
Figure 18:
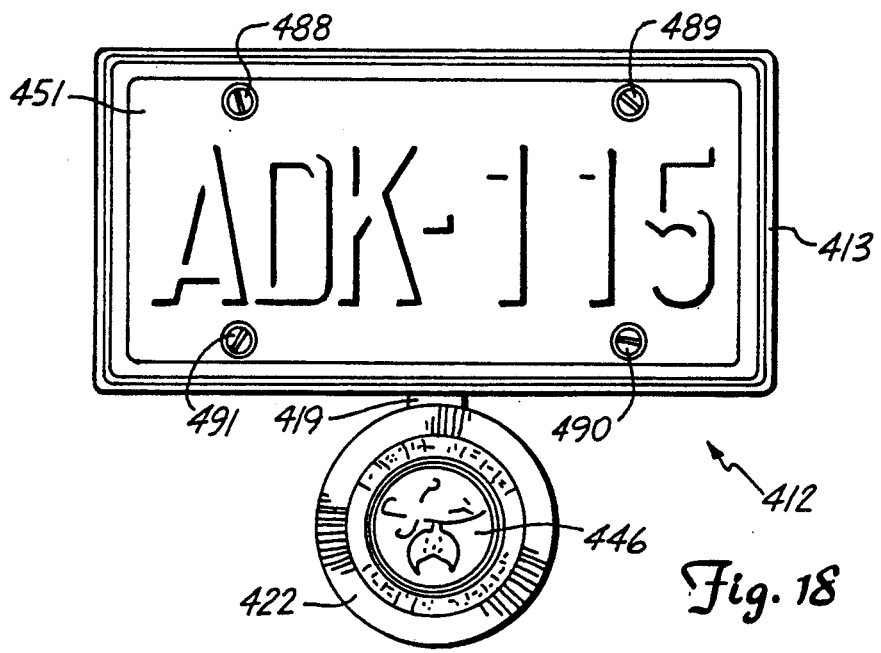
FIG. 18 is a front elevational view of a fourth modification of the emblem and license plate holder of the invention.

Referring to FIGS. 16, 17, 18, there is shown second, third and fourth modifications of the emblem and license plate holder of the invention, indicated generally at 212, 312 and 412. Holders 212, 312 and 412 are secured to the front or back end of a car to mount personal badges 222A, 222B, 322A, 322B and 422 and license plates 251, 351 and 451 on the vehicle.

Figure 14:
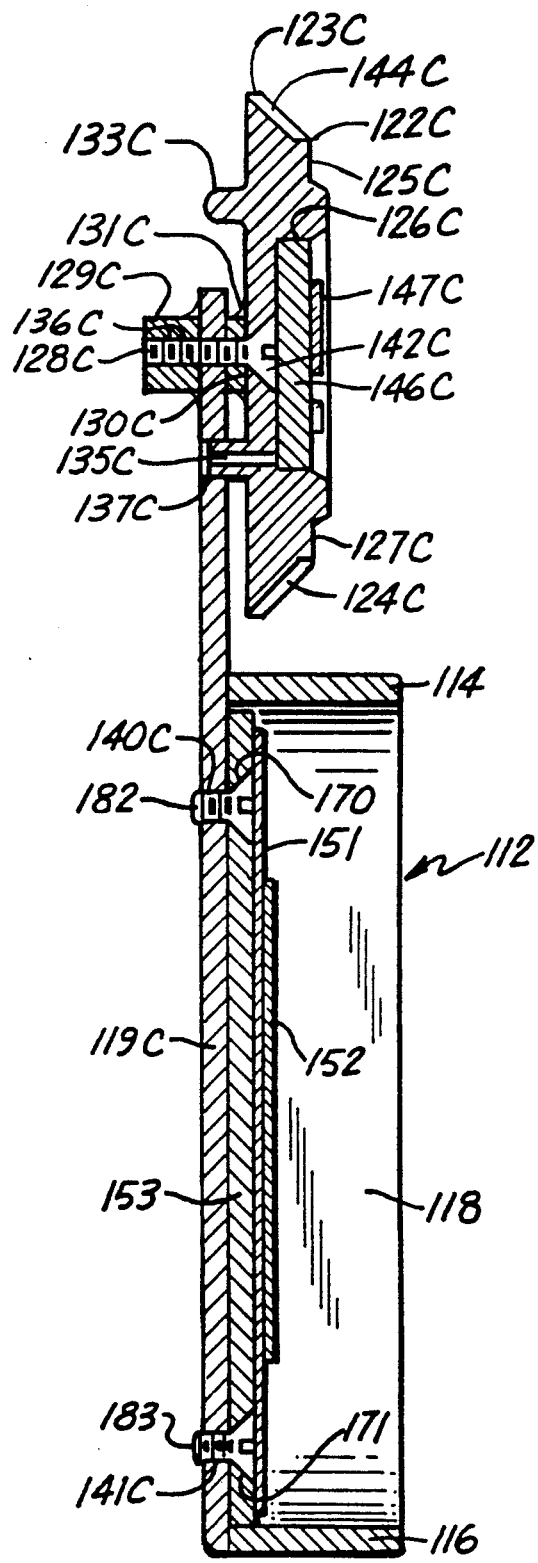
FIG. 14 is an enlarged sectional view taken along line 14—14 of FIG. 12.

Referring to FIG. 16, holder 212 has a generally rectangular frame 213 having top, bottom and side walls that define an inner recess. The recess accommodates license plate 251 which is mounted to the holder 212 with a plurality of bolts 288-291. The frame walls highlight plate 251. A pair of vertical mounting brackets 219A and 219B attached to a support plate, such as plate 153 shown in FIG. 15, carry badges 222A and 222B. Brackets 219A and 219B position badges 222A and 222B adjacent the top of frame 213. Badges 222A and 222B each have a generally circular body 246A and 246B that fits into a central recess in the badges and carries a symbol. A generally flat collar surrounding the central recesses of badges 222A and 222B has data inscribed thereon, such as the car model number, the locality of the car owner, the year of the car's manufacture and the like. Brackets 219A and 219B and badges 222A and 222B have the same structure as bracket 119C and badge 122 that are mounted on holder 112, as shown in FIG. 14.

Referring to FIG. 17, holder 312 has a generally rectangular frame 313 having an inner recess. The recess accommodates license plate 351 which is mounted to the holder 312 with a plurality of bolts 388-391. The walls of frame 313 highlight plate 351. A pair of horizontal mounting brackets 319A and 319B attached to a support plate, such as plate 153 shown in FIG. 15, carry badges 322A and 322B. Brackets 319A and 319B position badges 322A and 322B adjacent opposite sides of frame 313. Badges 322A and 222B each have a generally circular body 346A and 346B that fits into a central recess in the base of the badges and carries a symbol. A generally flat collar surrounding the central recesses of badges 322A and 322B has data inscribed thereon, such as the car model number, the locality of the car owner, the year of the car's manufacture and the like.

Referring to FIG. 18, holder 412 has a rectangular shaped frame 413 having an inner recess that accommodates license plate 451. Plate 451 is mounted to the holder 412 with a plurality of bolts 488-491. The top, bottom, and side walls of frame 413 highlight plate 451. A downwardly extending mounting bracket 419 attached to a support plate, such as plate 153 as shown in FIG. 15, carries a personal badge 422. Bracket 419 has a horizontal step that positions badge 422 adjacent the front edge of the bottom wall of frame 413. The location of badge 422 relative to the holder 412 draws attention to the badge. Badge 422 has a generally circular body 446 that fits into a central recess in the base of badge and carries a symbol. A generally flat collar surrounding the central recess of badge 422 has inscribed data thereon, such as the car model number, the year date of the car, and the like. Bracket 419 and badge 422 have the same structure as bracket 19 and badge 22, as shown in FIG. 7, except that bracket 419 extends down from holder 412.

Figure 20:
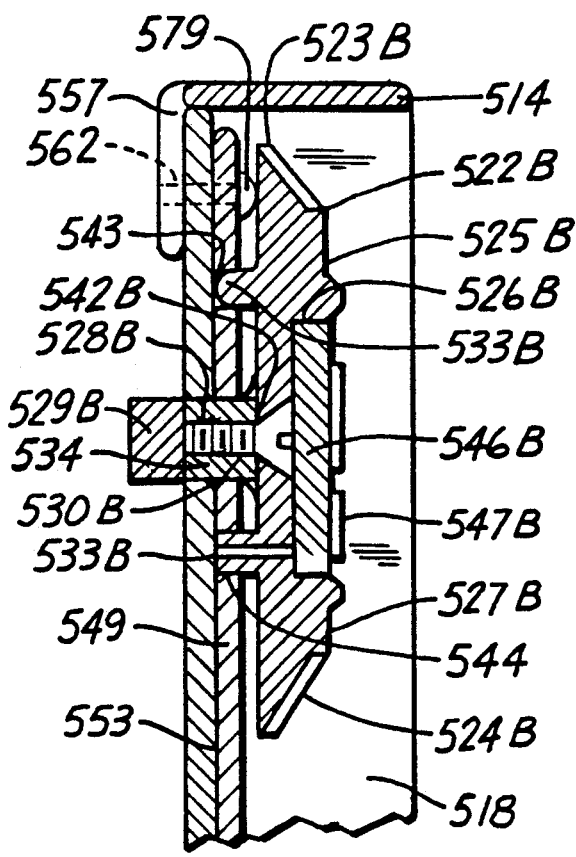
FIG. 20 is an enlarged sectional view taken along line 20—20 of FIG. 19.
Figure 21:
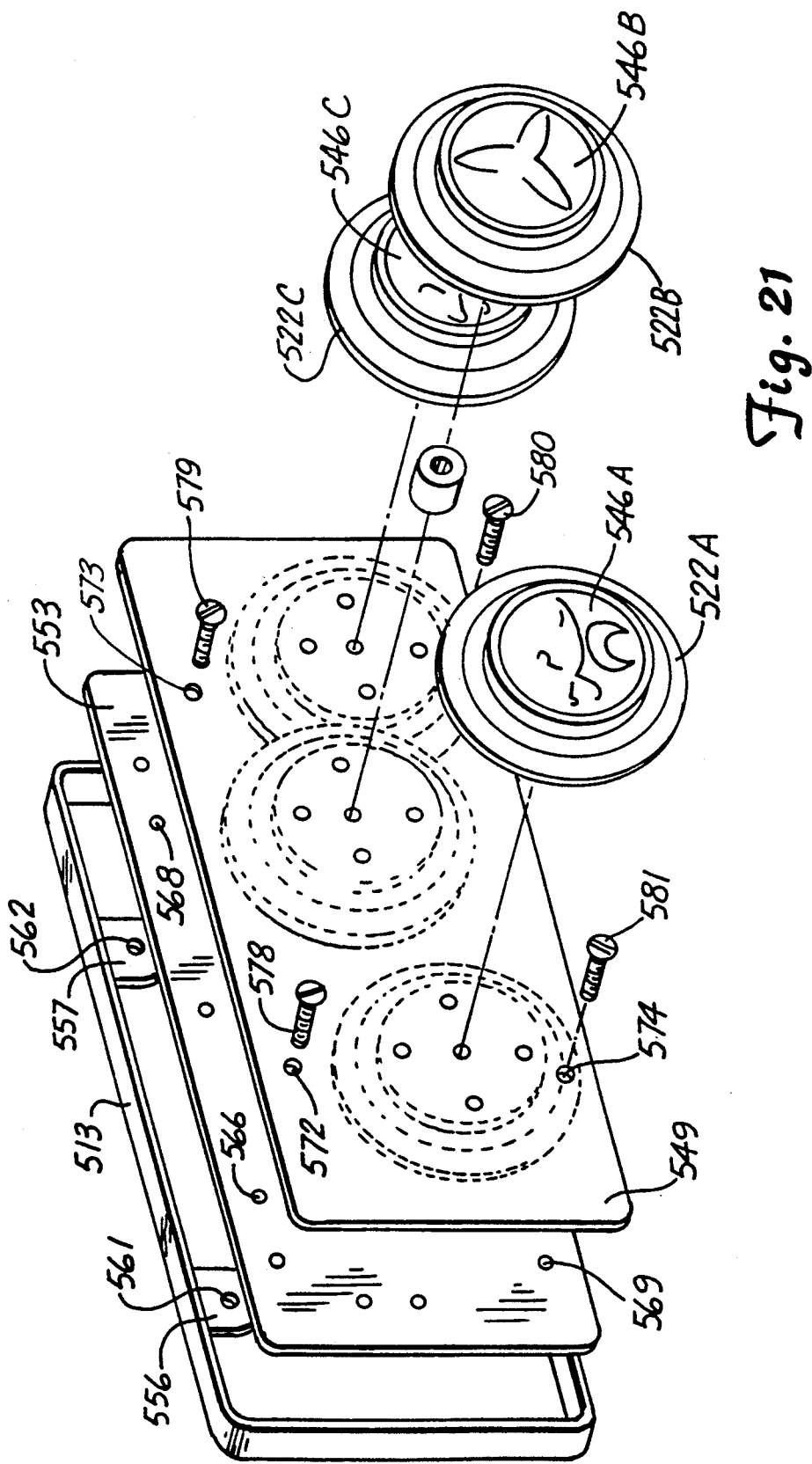
FIG. 21 is an exploded view of the emblem and license plate holder of FIG. 19.

Referring to FIGS. 19, 20 and 21, there is shown an emblem holder of the invention, indicated generally at 512. The emblem holder 512 provides for safe and secure installation of one or more personal badges 522A, 522B and 522B on the front end portion of an automobile. Holder 512 can be used in localities that do not require a license plate to be mounted to the front end of a car.

Holder 512 has a generally rectangular frame 513 having a top wall 514, bottom wall 516 and side walls 517 and 518 that define an inner recess. Walls 514, 516, 517 and 518 are generally flat having uniform widths. A first pair of semi-circular tabs 556 and 557 extend downwardly from top wall 514. A second pair of semi-circular tabs (not shown) extend upwardly from bottom wall 516. The tabs 556 and 557 are used to mount a generally rectangular badge plate 549 and a generally rectangular mounting plate 553 in the recess of holder 512. Walls 514, 516, 517 and 518 surround the perimeter of badge plate 549 and project outwardly therefrom to enhance the appearance of and draw attention to the badges 522A, 522B and 522C secured to the badge plate 549.

Badges 522A to 522C are identical in structure and function. The badges have circular bodies 546A, 546B and 546C attached thereto which carry car symbols. The following description is limited to badge 522B.

As shown in FIG. 20, badge 522B has a circular base 523B having an tapered rim 524B with a plurality of circumferentially spaced ribs and grooves. The center of the front of base 523B has a circular recess 526B. An annular lip 527B is located around the perimeter of the recess 526B. A generally flat collar 525B extended between the rim 524B and lip 527B carries inscribed information, such as the car model number, the place of residence of the car owner, the year date of the car, and the like. A bolt 528B extends through a hole 542B in base 523B, through a spacer or sleeve 534, and into badge plate 549 and mounting plate 553. Sleeve 534 spaces badge 522B from plate 549 to allow outer portions of badge 522B to overlap parts of badges 522A and 522C as shown in FIG. 19. A nut 529B attaches bolt 528B to badge plate 549 and mounting plate 553 to mount the badge 522B on holder 512. The back side of badge 522B has a centrally located hub 530B. A plurality of circumferentially spaced pegs 533B project from the back side of base 523B equidistant from hub 530B. Pegs 533B fit into a holes 543 and 544 in badge plate 549 to prevent badge 522B from rotating about bolt 528B and becoming misaligned when the car encounters rough terrain.

A generally circular body 546B having an outer face carries a symbol 547B. Body 546B fits into recess 526B engaging the inside surface of lip 527B. A location pin (not shown) projecting from the back surface of the body 546B extends through a bore in base 523B. A nut threaded on the end of the location pin secures body 546B in recess 526B of base 523B. Other structures can be used to secure body 546B to base 523B.

Referring to FIG. 21, badge plate 549 is located in holder 512 over top of mounting plate 553. Bolts 578, 579 and 581 extend through holes 572, 573, 574, 566, 568 and 569 in badge plate 549 and mounting plate 553 and cooperate with the first pair of tabs 556 and 557 and the second pair of tabs to secure plates 549 and 553 to holder 512. Bolt 580 extends through holes (not shown) in the lower left corners of the badge plate 549 and mounting plate 553 and through one of the second tabs. The outer ends of the bolts 578 to 581 are inserted through holes 561 and 562 of tabs 556 and 557 and holes in the second pair of tabs and threaded into the vehicle license plate mounting structure (not shown) to attach the holder 512 on an automobile.

Referring to FIGS. 22 and 23, there is shown first and second modifications of the vehicle badge holder 512 of the invention, indicated generally at 612 and 712. The vehicle badge holders 612 and 712 provides for safe and secure installation of one or more personal car badges 622, 722B and 722B on the front end portion of an automobile. Holders 612 and 712 can be used in localities that do not require a license plate to be mounted to the front end of a car. Holders 612 and 712 have the same structure as holder 512 shown in FIG. 19 except that holder 612 carries one badge and holder 712 carries two badges.

Referring to FIG. 22, holder 612 has a generally rectangular frame 613 having generally flat walls having uniform widths that define an inner recess. A generally rectangular badge plate 649 is mounted in the recess of holder 612. The walls of frame 613 surround the perimeter of badge plate 649 and project outwardly therefrom to enhance the appearance of and draw attention to badge 622 secured to the badge plate 649. A circular body 646 is attached to the center of the front of badge 646. Body 646 has face carrying a symbol. A plurality of bolts 678–681 are used to secure badge plate 649 to holder 612. Badge 622 is attached to the center of badge plate 649.

Referring to FIG. 23, holder 712 has a rectangular frame 713 that defines an inner recess. A generally rectangular badge plate 749 is mounted in the recess of holder 712. A pair of personal badges 722A and 722B are secured to adjacent lower corners of badge plate 749. Circular bodies 746A and 746B are attached to the center of the front surfaces of badges 746A and 746B. Bodies 746A and 746B have faces that carry symbols. A plurality of bolts 778 and 779 are used to secure badge plate 749 to holder 712.

Figure 24:
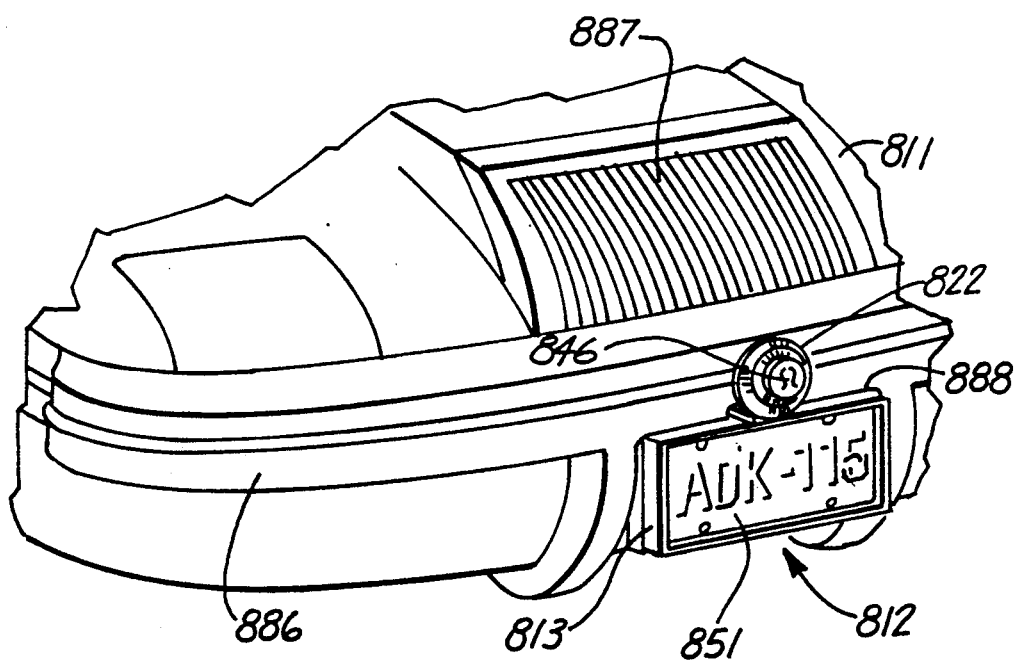
FIG. 24 is a front perspective view of an eighth modification of the emblem and vehicle license plate holder of the invention mounted in a recess on the front of an automobile.
Figure 25:
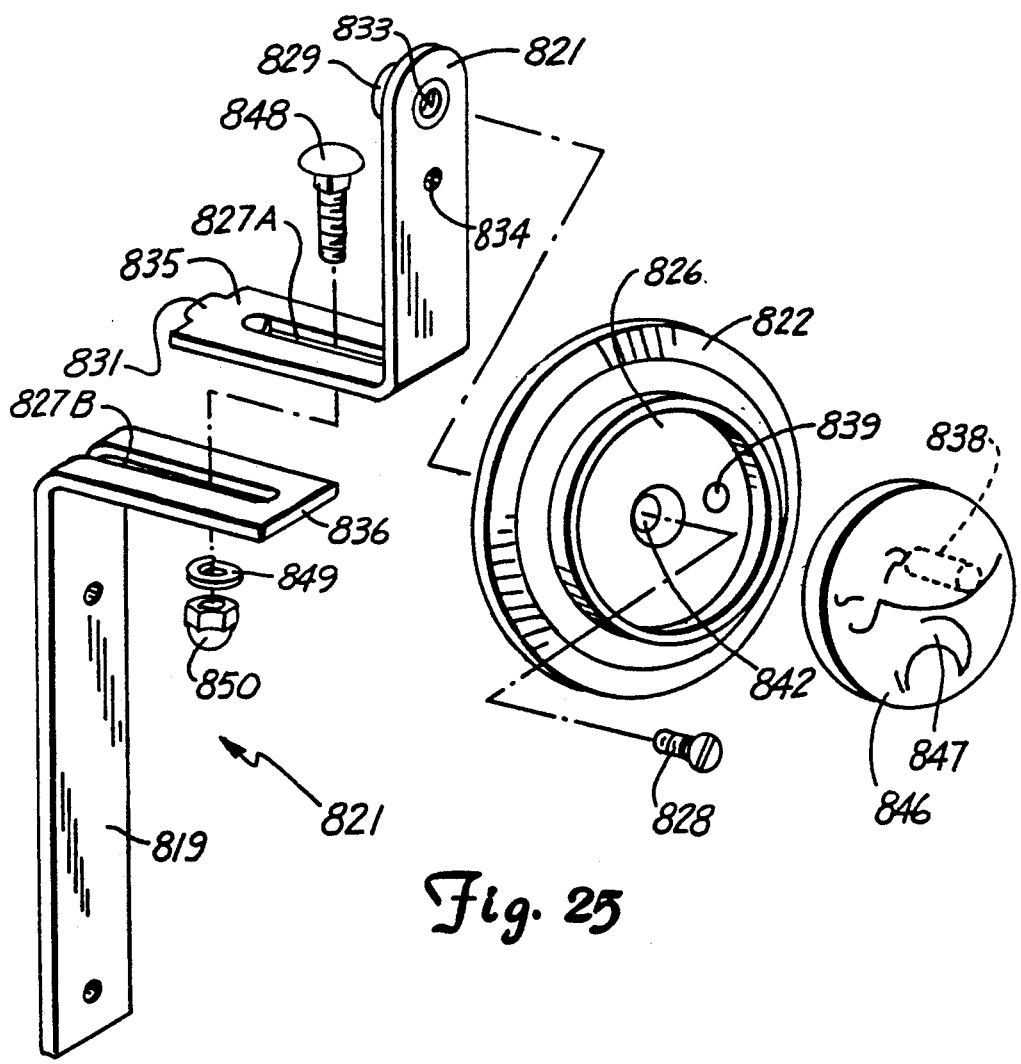
FIG. 25 is an exploded view of a portion of the emblem and license plate holder of FIG. 24.

Referring to FIGS. 24 and 25, there is shown an eighth modification of the emblem and license plate holder of the invention, indicated generally at 812. Holder 812 is secured to the bumper or frame of vehicle 811 in a recess 888 in the front end or bumper 886. Holder 812 can also be used on the back end of vehicle 811. Holder 812 is used to mount a personal badge or emblem 822 in front of the bumper and license plate 851 on vehicle 811. It is not necessary to mount emblem 822 on grill 887 of the vehicle.

Referring to FIG. 25, holder 812 has an adjustable mounting bracket 819 attached to the top and bottom portions on a plate, such as plate 153 shown in FIG. 15, to accommodate badge 822. Bracket 819 has an adjustable step 821 that positions badge 822 adjacent the front edge of the top of frame 813 in front of bumper 886. Step 821 has a horizontal top member 835 having an elongated slot 827A that is aligned with an elongated slot 827B in a horizontal bottom member 836 of bracket 819. A bolt 848 extends through slots 827A and 827B and cooperates with a washer 849 and nut 850 to secure bracket 819 to step 821. Horizontal member 835 of step 821 has a downwardly directed tab 831 that extends into groove 827B in horizontal member 836 to lock the position of the step 821 on the bracket 819. Loosing bolt 848 and nut 850 enables the step 821 to be moved in and out to a desired position. This structure allows holder 812 to be used with various models of cars having varying front recess depths.

Badge 822 has a generally circular body 846 that fits into a central recess 826 in the badge and carries a car symbol 847. A generally flat collar surrounding the central recess of badge 822 has personalized data inscribed thereon, such as the car model number, the locality of the car owner, the year of the car's manufacture and the like. A location pin 838 extends through a bore in the base of badge 822 to fix the position of body 846 relative to the badge. A bolt 828 extends through a central hole 842 in badge 822 and a hole 833 in step 821. A nut is threaded on the end of bolt 828 to secure the badge 822 to the bracket 819. A peg extending from the back side of the badge 822 (not shown) is placed in hole 834 in step 821 to prevent the emblem 822 from rotating about bolt 828.

While there has been shown and described preferred embodiments of the vehicle badge and license plate holders and vehicle badge holders of the invention it is understood that changes in the structure, arrangement of structure, and materials may be made by those skilled in the art without departing from the invention. The invention is defined in the following claims.

We claim:

1. An apparatus for holding a vehicle license plate and emblem assembly means comprising: a generally rectangular frame having ear means to accommodate fasteners for connecting a vehicle license plate to the ear means, said frame means having top and bottom members extended generally parallel to each other adjacent opposite edges of the license plate, said ear means being joined to and located rearwardly of the top and bottom members and projected inwardly of the top and bottom members toward each other, a generally rectangular mounting plate secured to the ear means with the fasteners for connecting the vehicle license plate to the ear means, said vehicle license plate being located over said plate, emblem assembly means having indicia, and bracket means connecting the emblem assembly means to the mounting plate.

2. The apparatus of claim 1 wherein: the frame has side members joined to the top and bottom members, said members surrounding the mounting plate and vehicle license plate.

3. The apparatus of claim 2 wherein: the members are generally flat strapped members projected outwardly from the plane of the mounting plate and surrounding the license plate.

4. The apparatus of claim 1 wherein: said emblem assembly means comprises a base having a recess and an annular surface surrounding the recess, a body located within said recess and secured to said base, said indicia comprising first indicia on the body and second indicia on said annular surface.

5. The apparatus of claim 4 including: a plurality of outwardly directed ribs surrounding the collar.

6. The apparatus of claim 4 wherein: said base and body have cooperating means to prevent rotation of the body relative to the base.

7. The apparatus of claim 4 wherein: said first indicia comprises artwork, and said second indicia comprises engraved information relating to the vehicle or its owner.

8. The apparatus of claim 4 wherein: said base is a first circular member having a central circular recess, an annular surface surrounding said recess, and an outwardly directed circular lip located between the circular recess and annular surface, and said body comprises a second circular member located within said recess and secured to said base.

9. The apparatus of claim 8 wherein: said base has a circular array of generally radial ribs surrounding said annular surface.

10. The apparatus of claim 8 wherein: said second circular member has an outer surface, said first indicia comprising artwork attached to said outer surface, and said second indicia comprising engraved information relating to the vehicle and its owner on said collar surface.

11. An apparatus for holding a vehicle license plate on a vehicle comprising: a frame having a top member having first and second ends, a bottom member having first and second ends extended generally parallel to the top member, a first side member joined to the first ends of the top and bottom members, a second side member joined to the second ends of the top and bottom members, said top, bottom, and first and second side members having a generally rectangular shape surrounding an area generally the size of a vehicle license plate, ear means joined to the top and bottom members adapted to accommodate fasteners for connecting a vehicle license plate to the frame and the frame to a portion of the vehicle, said ear means located rearwardly of the top and bottom members and projected inwardly toward each other whereby the vehicle license plate is recessed within the frame, generally rectangular mounting plate means located between the ear means and vehicle license plate, said plate means being secured to said ear means, and emblem assembly means having indicia, and means attaching the emblem assembly to said mounting plate means.

12. The apparatus of claim 11 wherein: said emblem assembly means comprises a base having a recess and a collar surface surrounding the recess, a body located within said recess and secured to said base, said indicia comprising first indicia on the body and second indicia on said annular collar surface.

13. The apparatus of claim 12 including: a plurality of outwardly directed ribs surrounding the collar.

14. The apparatus of claim 12 wherein: said base and body have cooperating means to prevent rotation of the body relative to the base.

15. The apparatus of claim 12 wherein: said first indicia comprises artwork, and second indicia comprises engraved information relating to the vehicle or its owner.

16. The apparatus of claim 15 wherein: said base is a first circular member having a central circular recess, and annular surface surrounding said recess, and an outwardly directed circular lip located between the circular recess and annular surface, and said body comprises a second circular members located within said recess and secured to said base.

17. The apparatus of claim 16 wherein: said base has a circular array of generally radial ribs surrounding said annular surface.

18. The apparatus of claim 16 wherein: said second circular member has an outer surface, said first indicia comprising artwork attached to said outer surface.

19. The apparatus of claim 11 wherein: the ear means comprise a first pair of ears joined to the top member and the second pair of ears joined to the bottom member, said first and second pairs of ears being vertically aligned with each other.

20. The apparatus of claim 19 wherein: each of said ears has a hole to accommodate a fastener.

21. The apparatus of claim 19 wherein: the mounting plate has generally the same dimensions the license plate.

* * * * *